United States Patent
De Gaillard et al.

(10) Patent No.: US 11,719,253 B2
(45) Date of Patent: Aug. 8, 2023

(54) BLADE PROVIDED WITH PLATFORMS POSSESSING ATTACHMENT PORTIONS

(71) Applicant: SNECMA, Paris (FR)

(72) Inventors: Thomas Alain De Gaillard, Massy (FR); Caroline Jacqueline Denise Berdou, Bures sur Yvette (FR); Alexandre Bernard Marie Boisson, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 1906 days.

(21) Appl. No.: 15/141,360

(22) Filed: Apr. 28, 2016

(65) Prior Publication Data
US 2017/0058912 A1 Mar. 2, 2017

(30) Foreign Application Priority Data

Apr. 29, 2015 (FR) ..................................... 15 53850

(51) Int. Cl.
*F01D 5/30* (2006.01)
*F04D 29/32* (2006.01)
(Continued)

(52) U.S. Cl.
CPC ............ *F04D 29/329* (2013.01); *B29B 11/16* (2013.01); *F01D 5/26* (2013.01); *F01D 5/282* (2013.01);
(Continued)

(58) Field of Classification Search
CPC ........ F01D 11/006; F01D 11/008; F01D 5/26; F01D 5/282; F01D 5/30–5/3046;
(Continued)

(56) References Cited

U.S. PATENT DOCUMENTS 4,453,890 A * 6/1984 Brantley ................ F01D 5/3007
416/193 A
4,872,810 A * 10/1989 Brown ...................... F01D 5/22
416/145

(Continued)

FOREIGN PATENT DOCUMENTS

WO WO 2013079860 A1 6/2013
WO WO 2013104852 A2 7/2013
WO WO 2014076408 A1 5/2014

OTHER PUBLICATIONS

Search Report dated Mar. 8, 2016, in corresponding French Patent Application No. FR 15 53850, filed on Apr. 29, 2015 (2 pages).

*Primary Examiner* — Sabbir Hasan
(74) *Attorney, Agent, or Firm* — Bookoff McAndrews, PLLC

(57) ABSTRACT

A preform for a turbine engine blade, comprising a main fiber preform obtained by three-dimensional weaving and comprising: a first longitudinal segment, suitable for forming a blade root; a second longitudinal segment, extending upwards from the first longitudinal segment and suitable for forming an airfoil portion; and a first transverse segment, extending transversely from the junction between the first and second longitudinal segments to a substantially linear distal edge and suitable for forming a first platform; the preform further including at least one attachment tab provided under the first transverse segment at its distal edge, suitable for forming an attachment portion of the platform.

20 Claims, 5 Drawing Sheets

(51) Int. Cl.
 *B29B 11/16* (2006.01)
 *F01D 5/28* (2006.01)
 *F01D 5/26* (2006.01)
 *F02K 3/06* (2006.01)
 *F04D 29/02* (2006.01)
 *F04D 29/34* (2006.01)
 *F04D 29/64* (2006.01)
 *B29L 31/08* (2006.01)

(52) U.S. Cl.
 CPC .............. *F01D 5/3007* (2013.01); *F02K 3/06* (2013.01); *F04D 29/023* (2013.01); *F04D 29/34* (2013.01); *F04D 29/646* (2013.01); *B29L 2031/08* (2013.01); *F05D 2220/36* (2013.01); *Y02T 50/60* (2013.01)

(58) Field of Classification Search
 CPC ........ F01D 5/3084; F01D 5/323; F01D 5/326; F01D 5/3007; F01D 5/3015; F02K 3/06; F04D 29/023; F04D 29/322; F04D 29/329; F04D 29/34; F04D 29/646
 See application file for complete search history.

(56) References Cited

U.S. PATENT DOCUMENTS

| | | | |
|---|---|---|---|
| 5,161,949 A | * | 11/1992 | Brioude .................... F01D 5/22 416/193 A |
| 6,627,019 B2 | * | 9/2003 | Jarmon ................. C04B 35/806 156/89.11 |
| 2010/0189556 A1 | | 7/2010 | Propheter-Hinckley et al. |
| 2015/0125305 A1 | | 5/2015 | Duelm et al. |
| 2015/0337661 A1 | | 11/2015 | Alarcon et al. |

* cited by examiner

BLADE PROVIDED WITH PLATFORMS POSSESSING ATTACHMENT PORTIONS

CROSS-REFERENCE TO RELATED APPLICATIONS

This application claims priority to French Patent Application No. FR 15 53850, filed on Apr. 29, 2015, the entirety of which is incorporated by reference herein.

FIELD OF THE INVENTION

The present description relates to a preform for a turbine engine blade and also in particular to a single-piece blade suitable for being formed by means of such a preform, to a rotor wheel, and to a turbine engine including such a blade.

Such a preform can be used for making blades having aerodynamic platforms with attachment portions suitable for being held by hooks provided on the rotor of the engine. Such blades may in particular be fan blades of an airplane turbojet, to mention but one example.

STATE OF THE PRIOR ART

In order to reduce the weight of airplane turbojets, and thus reduce the fuel consumption of such turbojets, it is already known to fabricate some of the blades of the jet out of composite material, which is much lighter than the metal that has been conventionally used in the past.

For this purpose, it is now known to use three-dimensional weaving techniques in order to obtain fiber preforms giving rise to composite blades of very good quality. Document WO2014/076408 describes in particular a method of weaving a fiber preform that makes it possible to obtain single-piece blades provided with pressure side and suction side platforms, which platforms are of constant thickness.

Nevertheless, such platforms need to satisfy a large number of requirements and to perform numerous functions. Mainly, such platforms need to perform an aerodynamic function of defining and channelling the air-flow passage through the turbojet. Nevertheless, they also need to ensure that a guaranteed level of mechanical strength is provided during all stages of flight, and they need to be properly integrated into the environment of the engine, specifically by avoiding giving rise to disturbances in the downstream air flow. Thus, the shape of platforms needs to be under close control, throughout the operation of the engine, and regardless of its stage of flight.

Unfortunately, during tests and simulations performed on such blades, the inventors have observed in particular that various zones of such platforms obtained by 3D weaving become deformed to a greater or lesser extent under the effect of the centrifugal forces that act while the turbine engine is in operation. In particular, the inventors have observed that the deformation of a zone of a platform increases with increasing offset from the airfoil.

Under such circumstances, such platforms present shape irregularities in operation that can disturb the flow of air and thus the efficiency of the turbine engine. In addition, the inventors have observed that such bending depends, amongst other things, on the cantilevered-out length. Thus, since the cantilever differs between the suction side platform and the pressure side platform of two consecutive blades, there is a discontinuity of bending at this interface and a risk of the platforms overlapping.

There therefore exists a real need for a preform, a blade, a disk, a downstream drum, a rotor wheel, and a turbine engine that do not present the drawbacks inherent to the above-mentioned known systems, at least in part.

SUMMARY OF THE INVENTION

The present description relates to a preform for a turbine engine blade, comprising a main fiber preform obtained by three-dimensional weaving and comprising: a first longitudinal segment, suitable for forming a blade root; a second longitudinal segment, extending upwards from the first longitudinal segment and suitable for forming an airfoil portion; and a first transverse segment, extending transversely from the junction between the first and second longitudinal segments to a substantially linear distal edge and suitable for forming a first platform; the preform further including at least one attachment tab provided under the first transverse segment at its distal edge, suitable for forming an attachment portion of the platform.

By means of such a preform, it is possible to obtain a single-piece blade comprising a blade root, an airfoil portion, and at least one platform provided with an attachment portion. Such an attachment portion is adapted to cooperate with one or more hooks provided on the rotor of the rotor wheel, e.g. on the disk, on the downstream drum, or indeed on the upstream shroud. Cooperation between the hooks and the attachment portions then serves to retain or block the platforms against the centrifugal forces that act on them while the turbine engine is in operation. This limits the deformation of the platform in operation.

In particular, it is possible to provide such attachment portions in the zones of the platform that are usually deflected to a large extent by centrifugal force. Under such circumstances, the platform conserves a relatively regular profile in operation leading to little or no disturbance to the flow of the air stream.

By means of this preform, it is thus possible to benefit from the advantages of a 3D woven single-piece blade (saving in weight; small number of parts; simplified assembly and maintenance; etc.) while ensuring that the air stream presents aerodynamic regularity.

Furthermore, the cooperation between the hooks and the attachment portions of the blades also serves to reduce the discontinuity at the interface between adjacent platforms as is usually observed in operation. In addition, such a configuration also makes it possible to reduce the risk of one platform overlapping over the neighbouring platform, e.g. in the event of a bird being ingested.

In the present description, the terms "longitudinal", "transverse", "bottom", "top", and their derivatives are defined relative to the main direction of the blade under consideration, the blade root being situated at the bottom end of the blade in this reference frame; the terms "proximal", "distal", and their derivatives are defined relative to the airfoil of the blade; the terms "axial", "radial", "tangential", and their derivatives are defined relative to the main axis of the wheel that includes the blades, i.e. in general the axis of the turbine engine. The term "axial plane" designates a plane containing the main axis of the turbine engine, and the term "radial plane" designates a plane perpendicular to said main axis; the term "longitudinal plane" designates a plane parallel to the main direction of the blade and perpendicular to the direction in which the blade root extends: such a longitudinal plane is thus a radial plane in the reference frame of the turbine engine. Furthermore, the terms "upstream" and "downstream" are defined relative to the flow of air through the turbine engine.

Finally, the term "three-dimensional weaving" designates a weaving technique in which the weft yarns travel among parallel rows of warp yarns so as to form a three-dimensional array of yarns in a three-dimensional weave: all of the layers of yarns in such a fiber structure are thus woven during a single step of weaving in a three-dimensional loom.

In certain embodiments, at least one attachment tab is an extra length of the main fiber preform extending from the distal edge of the first transverse segment and configured to be folded under the first transverse segment. The preform can then comprise nothing more than a single-piece part, the main fiber preform, which is woven in a single step, thereby simplifying the fabrication method. The cohesion between the platform and the attachment portion as obtained in this way is furthermore reinforced.

In certain embodiments, at least one attachment tab is configured to be folded into an L-shape under the first transverse segment.

In certain embodiments, at least one attachment tab is configured to be folded into a U shape under the first transverse segment. During injection of the matrix, this makes it possible to close the attachment tab and thus form an attachment portion in the form of a box section.

In certain embodiments, at least one attachment tab is wrapped at least in part around a hollow insert. Such an insert, e.g. made of metal or of composite material, serves to reinforce the structure of the resulting attachment portion.

In certain embodiments, the hollow insert is a cylindrical box section on a polygonal base, preferably on a rectangular base.

In certain embodiments, at least one attachment tab is fitted under the first transverse segment of the main fiber preform. The fact of fitting such an attachment tab to the main fiber preform makes it possible to conserve the existing weaving strategy for the main fiber preform, thereby simplifying weaving, and also providing greater freedom in the choice of shape for the preform by avoiding any weakening of its structure. In addition, since the attachment tab is fitted under the platform, there is considerable freedom in its design: its shape can thus be adapted precisely to a particular type of blade or of hook.

In certain embodiments, at least one attachment tab as fitted in this way is a cylindrical box section on a polygonal base, preferably a rectangular base.

In other embodiments, at least one attachment tab as fitted in this way is a box section of prismatic shape. Such a shape is particularly adapted to hooks of tapering shape, in particular of triangular shape. Such a hook makes it possible to have horizontal contact between the hook and the attachment tab.

In certain embodiments, at least one attachment tab is provided at the upstream or downstream end of the first transverse segment. Specifically, for a suction side platform, these upstream and downstream ends of the platform are usually subjected to large amounts of deformation.

In certain embodiments, at least one attachment tab is provided in the middle zone of the first transverse segment. This means that the attachment tab is situated for the most part in the zone that is axially centered on the midpoint of the distal edge of the first transverse segment and that extends axially at most over 25% of the length of the distal edge. Specifically, for a pressure side platform, this middle zone is usually subjected to large amounts of deformation.

In certain embodiments, the axial length of the attachment tab is less than one fourth, preferably less than one fifth, of the length of the distal edge of the first transverse segment.

In certain embodiments, the main fiber preform has a second transverse segment extending transversely from the junction between the first and second longitudinal segments to a substantially linear distal edge in line with and away from the first transverse segment, suitable for forming a second platform; and the preform also has at least one attachment tab provided under the second transverse segment at its distal edge, suitable for forming an attachment portion of the second platform.

It can naturally be understood that all the characteristics mentioned above on the topic of the first transverse segment may be transposed to the second transverse segment. In particular, the attachment tab(s) of the second transverse segment may be identical or different in nature compared with the attachment tab(s) of the first transverse segment.

In certain embodiments, the yarns used for weaving the main fiber preform are made of carbon fibers. Nevertheless, any other type of yarn may be used, e.g. made of glass fibers or Kevlar fibers.

In certain embodiments, the weave used for the three-dimensional weaving of the main fiber preform is of the 3D interlock type. Nevertheless, outside surfaces of the preform may be woven in essentially two-dimensional manner, e.g. of the satin weave type.

The present description also provides a blade for a turbine engine, the blade comprising: a blade root; an airfoil portion extending upwards from the blade root; a platform made of composite material and extending transversely to the airfoil portion at the junction between the blade root and the airfoil portion; and an attachment portion provided under the platform at its distal end, configured to cooperate with a hook of the turbine engine.

It can be understood that this blade corresponds to the blade that can be obtained using the above preform. Nevertheless, such a blade could also be obtained from the above-described main fiber preform, the attachment portion being fitted to the platform after the main fiber preform has been consolidated. In both situations, all of the above-described characteristics and advantages are transposed directly to such a blade, regardless of the technique used for obtaining it.

In certain embodiments, the blade is made as a single piece of composite material by means of a preform according to any of the above embodiments, said preform being shaped in a mold and embedded in a matrix.

In certain embodiments, the matrix is of the organic type. In particular it may comprise an epoxy resin.

In other embodiments, the matrix is of the ceramic type.

In certain embodiments, the attachment portion is fitted to the platform.

The present description also relates to a disk for a rotor wheel, the disk having its circumference presenting a succession of slots and of teeth, the slots being configured to receive blades in accordance with any preceding embodiment, wherein at least one tooth, and preferably each tooth, is provided with a hook extending radially from the top of the tooth and configured to cooperate with an attachment portion of a blade.

By means of the cooperation between the hook of the disk and a blade of the invention, it is possible to control the movement of the platform relative to the disk and thus to control the deformation of the platform.

In certain embodiments, at least one hook is machined in the thickness of the disk.

In other embodiments, at least one hook is fitted on the disk. For example, such a hook may be fitted by bolting, screwing, or assembling together complementary shapes (by way of example, the disk may have a slot of upsidedown T shape formed in the axial direction of the tooth, and the root of the hook may possess a shape complementary to such a groove).

In certain embodiments, at least one tooth, and preferably each tooth, is provided with at least one pair of two distinct hooks. The adjacent pressure side and suction side platforms thus cooperate with a different one of the hooks in each pair. Naturally, it is possible to provide as many pairs of hooks as there are attachment portions on a given platform.

In certain embodiments, at least one tooth, and preferably each tooth, is provided with a hook possessing two distinct attachment fingers. Thus a given hook can cooperate simultaneously with the adjacent pressure side and suction side platforms.

The present description also relates to a downstream drum for a rotor wheel configured to rotate synchronously with a disk carrying a plurality of blades in accordance with any of the above embodiments and including at least one hook extending from its upstream face and configured to cooperate with an attachment portion of a blade. Such a downstream drum, also referred to sometimes as a "booster drum", is present in particular immediately downstream from the disk and the movable blades of a turbojet fan. A double hook analogous to that described above is also possible.

The present description also relates to an upstream shroud for a rotor wheel configured to rotate synchronously with a disk carrying a plurality of blades in accordance with any of the above embodiments, the shroud including at least one hook extending from the upstream face of the downstream drum and configured to cooperate with an attachment portion of a blade. Such an upstream shroud is present in particular immediately upstream from the disk and the movable blades of a turbojet fan. A double hook analogous to that described above is also possible.

The present invention also relates to a rotor wheel for a turbine engine, the wheel comprising a plurality of blades in accordance with any of the above embodiments and a disk, a downstream drum, or an upstream shroud in accordance with any of the above embodiments.

In certain embodiments, at least one hook, preferably each hook, penetrates into the coinciding attachment portion of a blade from the downstream end. This makes it easier to install and remove the wheel.

In certain embodiments, radial clearance of at least 0.5 millimeters (mm) is provided between the attachment portion of a given platform and the corresponding hook while the wheel is stationary. This serves to leave at least some freedom of movement to the platform while it is in operation so as to avoid accumulating excessive stresses in the attachment portion or the hook. The initial shape of the platform and this radial clearance are thus preferably adjusted as a function of the shape desired for the platform in operation.

In certain embodiments, tangential clearance of at least 1 mm is provided between the attachment portion of a given platform and the corresponding hook while the wheel is stationary. Such clearance leaves the platform with a certain amount of freedom to move laterally so as to be able to withstand a large impact, e.g. in the event of ingesting a bird. The attachment portion then retains the platform tangentially solely in the event of an excessive lateral movement.

The present description also relates to a turbine engine that includes at least one blade or wheel in accordance with any of the above embodiments.

The above-mentioned characteristics and advantages, and others, appear on reading the following detailed description of embodiments of the proposed preform, blade, disk, downstream drum, rotor wheel, and turbine engine. This detailed description makes reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of element) that are identical are identified by the same reference signs. In addition, elements (or portions of an element) that belong to different embodiments, but that are analogous in function, are identified in the figures by numerical references incremented by 100, 200, etc.

DETAILED DESCRIPTION OF EMBODIMENTS

In order to make the invention more concrete, embodiments are described below in detail with reference to the accompanying drawings. It should be recalled that the invention is not limited to these embodiments.

Figure 1:
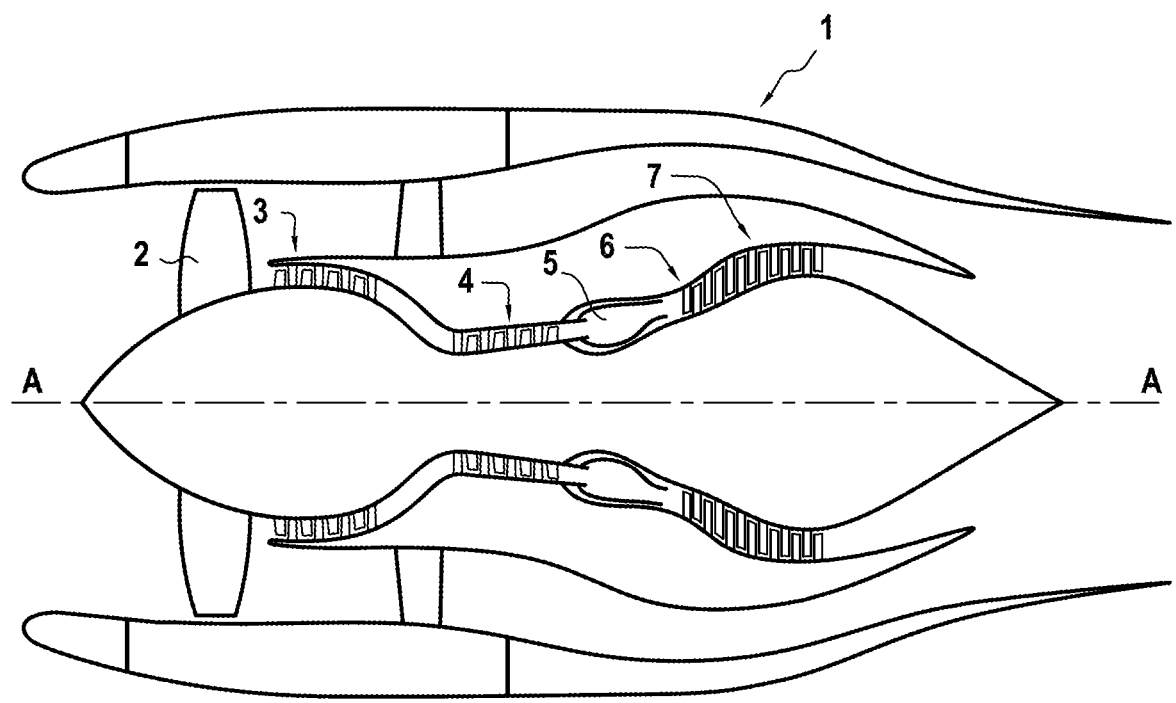
FIG. 1 is an axial section view of a turbine engine of the invention.

FIG. 1 is a view of a bypass turbojet 1 of the invention, shown in section on a vertical plane containing its main axis A. From upstream to downstream in the flow direction of the air stream, it comprises: a fan 2; a low-pressure compressor 3; a high-pressure compressor 4; a combustion chamber 5; a high-pressure turbine 6; and a low-pressure turbine 7.

Figure 2:
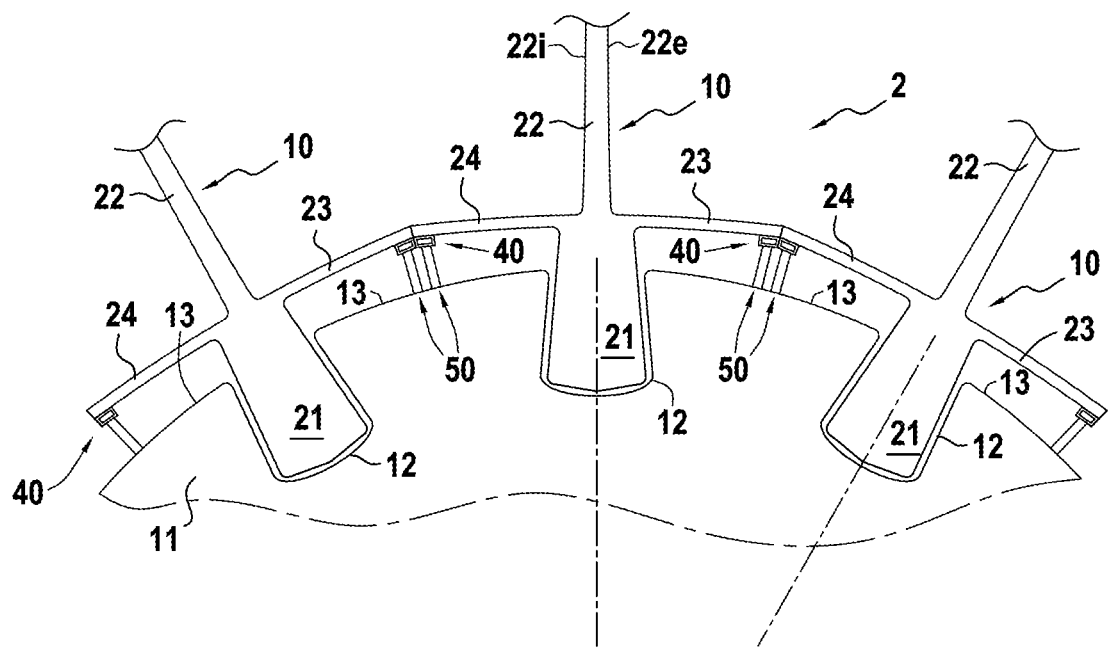
FIG. 2 is a fragmentary radial section diagram of a rotor wheel of the invention.
Figure 3:
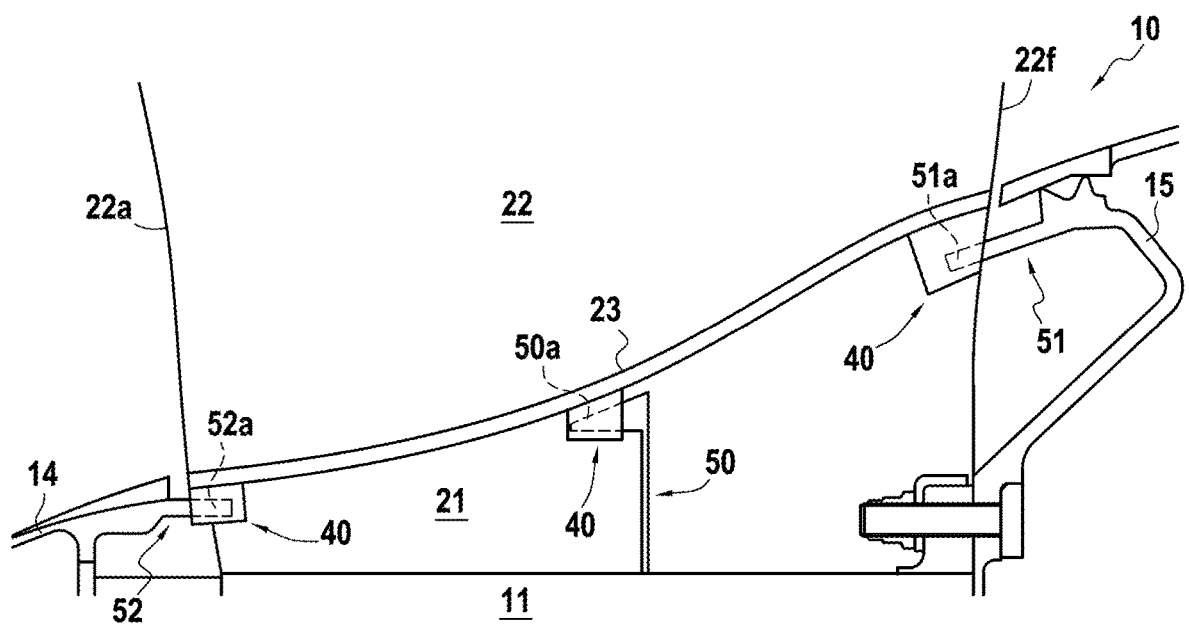
FIG. 3 is an axial section diagram of a rotor wheel of the invention.

The fan wheel 2 is shown in greater detail in FIGS. 2 and 3. It comprises an upstream shroud 14, a fan disk 11, and a downstream drum 15, also referred to as a "booster drum".

A plurality of slots 12 are formed in the outside surface of the fan disk 11: these slots 12 are rectilinear and they extend axially from upstream to downstream all along the disk 11. They are also regularly distributed around the axis A of the disk 11. In this manner, each slot 12 co-operates with its neighbour to define a tooth 13 that thus likewise extends axially from upstream to downstream all along the disk 11.

The fan wheel 2 also comprises a plurality of blades 10 mounted in the slots 12 of the fan disk 11. Each blade 10 has a dovetail blade root 21 configured to engage in a slot 12 of the disk 11 so as to fasten it to the disk 11. This blade root 21 is extended upwards by an airfoil 22 presenting a suction side face $22e$ and a pressure side face $22i$, each extending from upstream to downstream between a leading-edge $22a$ and a trailing edge $22f$.

The blade 10 also has a suction side platform 23 extending transversely from the suction side of the blade from the junction between the blade root 21 and the airfoil 22, and a pressure side platform 24 extending transversely from the pressure side of the blade from the junction between the blade root 21 and the airfoil 22.

The upstream shroud 14 and the downstream drum 15 are connected to the disk 11, which disk is coupled to the low-pressure shaft of the turbojet 1. Thus, while the turbojet is in operation, the upstream shroud 14, the fan disk 11, the blades 10, and the downstream drum 15 are driven together in rotation by the low-pressure turbine 7.

At the distal end of each of the platforms 23 and 24, and on its insides, there are provided a plurality of attachment portions 40. Each of these attachment portions 40 is in the form of a box section or of a pipe segment arranged against the bottom surface of the corresponding platform 23, 24, along its distal edge 23a, 24a. These attachment portions 40 thus form substantially cylindrical cavities 41 on rectangular bases that are open both upstream and downstream.

In this embodiment, each platform 23, 24 has three attachment portions 40: a first at the downstream end of the platform 23, a second in the middle zone of the platform 23, and a third at the upstream end of the platform 23. Nevertheless, it is clear that an arbitrary number of attachment portions 40 could be used, in particular as a function of the lengths of the platforms 20, 24, on the magnitudes of their overhangs, and on the configuration of the wheel 2.

Each attachment portion 40 is configured to cooperate with a hook of the fan wheel 2. Three types of hook are described in this first embodiment.

Each tooth 13 thus possesses two hooks 50 for co-operating with respective attachment portions 40 situated in the middle zones of the coinciding platforms 23, 24. Each hook 50 thus extends radially from the top of the tooth 13 and possesses an attachment finger 50a that engages from downstream inside the cavity 41 of the attachment portion 40 of the platform 23, 24 in question. The attachment finger 50a may be triangular in shape, tapering from the body of the hook: the cavity 41 of the attachment portion 40 of the platform 23, 24 then possesses a complementary prismatic shape as a wedge shape. In a variant, the attachment finger 50a may also be of constant profile.

The downstream drum 15 also possesses a plurality of hooks 51, with their attachment fingers 51a configured to cooperate with the attachment portions 40 situated at the downstream ends of the platforms 23, 24. Likewise, the upstream shroud 14 possesses a plurality of hooks 52 with their attachment fingers 52a configured to cooperate with the attachment portions 40 situated at the upstream ends of the platforms 23, 24.

Figure 4:
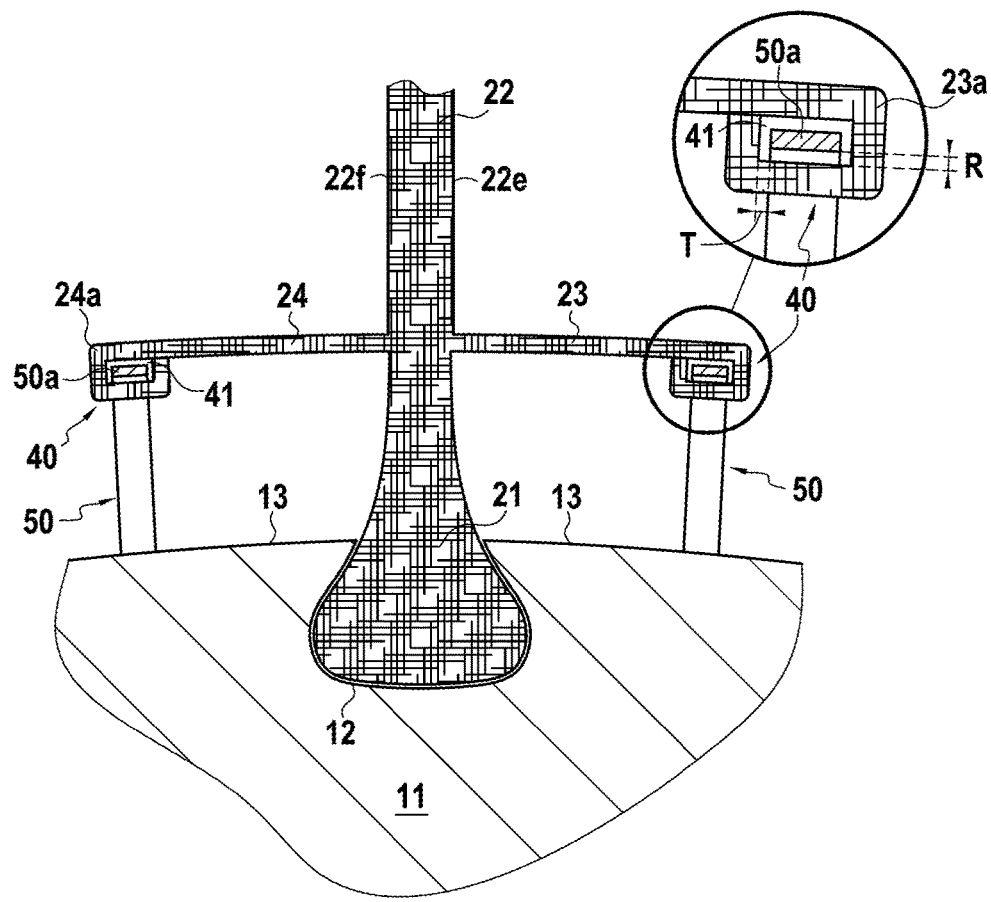
FIG. 4 is a fragmentary radial section view of a rotor wheel in a first embodiment.

As can be seen more clearly in FIG. 4, when stationary, radial clearance R is left between the bottom face of the attachment finger 50a and the bottom face of the cavity 41; and, when stationary, radial clearance T is also left between the proximal face of the attachment finger 50a and the proximal face of the cavity 41. Such clearances may also exist with the other types of hook 51 and 52.

In the first embodiment, better shown in FIG. 4, the blade 10 is obtained as a single piece by 3D weaving a preform 30 and by injecting an organic resin using the resin transfer molding (RTM) method, known to the person skilled in the art.

Figure 5:
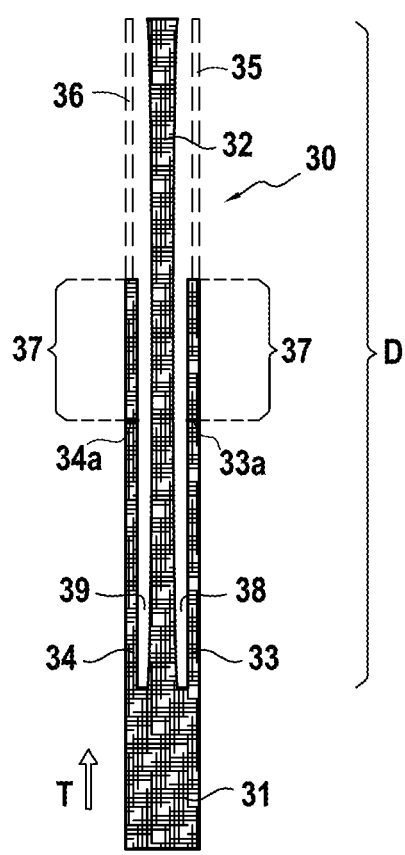
FIG. 5 is a diagram showing the preform corresponding to the blade of this first embodiment, prior to shaping.
Figure 6:
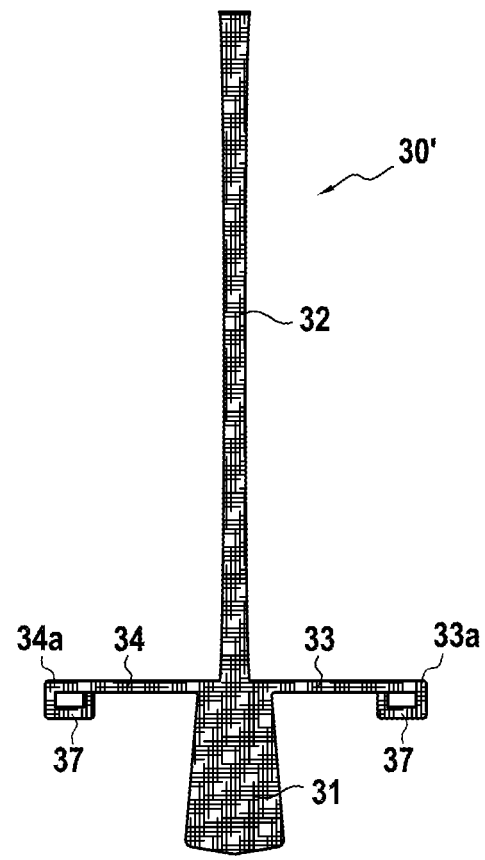
FIG. 6 is a diagram showing the preform corresponding to the blade of this first embodiment, after shaping.

FIG. 5 shows this three-dimensionally woven preform 30 suitable for making this embodiment of the blade 10. FIG. 6 shows the final preform 30' after it has been shaped. The preform 30 is described from bottom to top, i.e. from upstream to downstream in the weaving direction T. Nevertheless, it is clear that the weaving could be performed starting from the other end and in the opposite direction.

In this embodiment, the preform 30 is three-dimensionally woven out of carbon fibers using a 3D interlock weave. Only the surfaces of the preform 30 are woven two-dimensionally using a satin type weave.

At the bottom end, weaving begins by making a first longitudinal segment 31 that is to form the root 21 of the blade 10.

Above this first longitudinal segment 31, there begins a zone of non-interlinking D in which a first free panel 35, a second longitudinal segment 32, and a second free panel 36 are woven jointly in non-interlinked manner with respective non-interlinking planes 38 and 39. Methods that enable such non-interlinking are now well known in the field of 3D weaving.

As from a certain level, which may vary depending on the weaving plane, the free panels 35, 36 have reached the lengths desired for the platforms 23, 24 in question in the weaving plane under consideration. As from the distal edge 33a, 34a as defined in this way, weaving continues in certain planes only in order to form tabs 37 that extend from the distal edge 33a, 34a.

In a variant, the weaving may continue from the distal edge 33a, 34a in uniform manner all along the free panel 35, 36: under such circumstances, the tabs 37 are obtained by cutting out or machining.

Once weaving has finished, the free panels 35, 36 are cut out: on the suction side this provides a first transverse segment 33 that extends to the distal edge 33a, and that is to form the suction side platform 23 of the blade 10 together with a plurality of attachment tabs 37 extending from some of the segments of the distal edge 33a so as to form attachment portions; on the pressure side, this provides a second transverse segment 34 that extends to the distal edge 34a, and that is to form the pressure side platform 24 of the blade 10 together with a plurality of attachment tabs 37 extending from some of the segments of the distal edge 34a so as to form attachment portions. It should be observed at this point that the terms "transverse" and "longitudinal" are used as a function of the final position of the segment in question, the transverse segments necessarily being woven longitudinally prior to being folded transversely.

The preform 30 can then be moistened in order to soften it and make it easier to move fibers out of register. The preform 30 is then put into a shaping mold having its inside space matching the shape desired for the preform 30. During this step, the attachment tabs 37 are folded in U-shapes under the transverse segments 33 and 34, with the ends of the tabs 37 being pressed against the bottom surfaces of the corresponding transverse segments 33, 34.

Thereafter, the preform 30 is dried so as to stiffen it, thus blocking the shape imparted during shaping. The preform 30 as shaped in this way is finally placed in an injection mold having the dimensions of the desired final blade 10, and a matrix is injected therein, specifically an epoxy resin. By way of example, such injection may be performed using the RTM method. This consolidation thus serves to block the shape of the blade and to secure the ends of the tabs 37 against the bottom surfaces of the platforms 23 and 24. Thus, at the end of this step, a single piece blade 10 is obtained that is made out of composite material and that is provided with attachment portions 40.

Naturally, the above-described weaving example is merely one out of numerous other possible examples that the person skilled in the art will easily recognise. In particular, it is possible to imagine other forms of non-interlinking or to use other weaving techniques such as layer crossings, extracting layers, or thickness transitions in order to obtain a preform of analogous shape. The person skilled in the art can find numerous examples of weaving in Document WO2014/076408.

Figure 7:
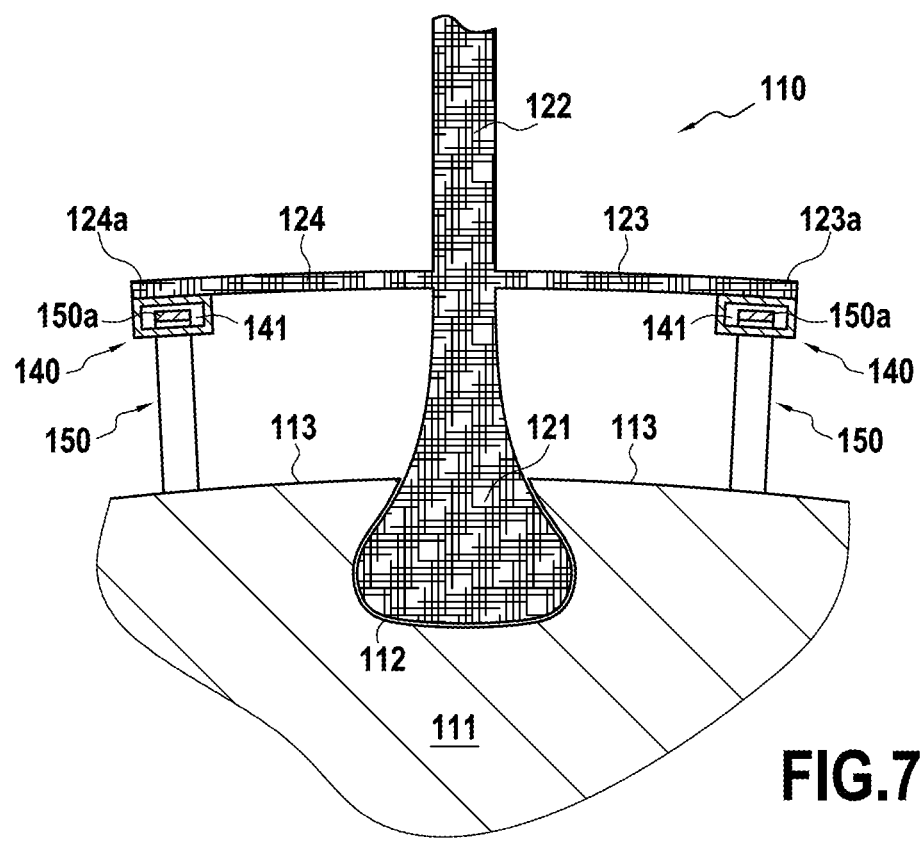
FIG. 7 is a fragmentary radial section view of a rotor wheel in a second embodiment.

In a second embodiment, shown in FIG. 7, the attachment portions are in the form of box sections 140 that are rectangular in section, extending against the bottom surfaces of the platforms 123, 124, along certain segments of their distal edges 123a, 124a. This metal or composite box section is hollow and thus forms a cavity 141 that opens out axially both upstream and downstream.

Such a blade 110 can be obtained using a fabrication process analogous to the first embodiment. A main fiber preform analogous to the fiber preform 30 of the above embodiment is thus woven, and then the box sections 140, acting as attachment tabs, are fitted against the bottom surfaces of the transverse segments of the main preform, e.g. using rivets or spots of adhesive, the completed preform then being subjected to co-injection.

Alternatively, the box sections 140 may be fitted, by adhesive, riveting, bolting, or any other method, to a composite blade that has already been consolidated, e.g. obtained from a main fiber preform analogous to that described in the context of the first embodiment, but without any extra length of weaving beyond the distal edges of the transverse segments.

Figure 8:
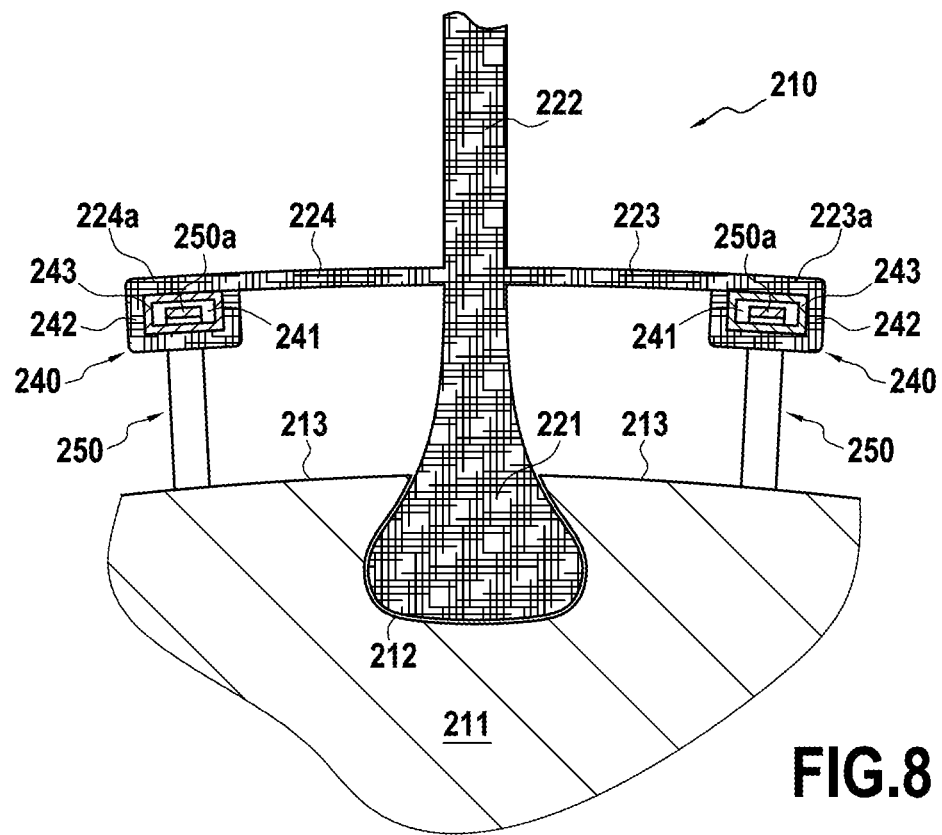
FIG. 8 is a fragmentary radial section view of a rotor wheel in a third embodiment.

In a third embodiment, shown in FIG. 8, the attachment portions 240 are in the form of box sections 243 analogous to the box section 140 of the above embodiment having woven tabs 242 analogous to the extra lengths of the first embodiment wrapped around them. Each attachment portion 240 is thus likewise hollow and forms a cavity 241 that opens out axially both upstream and downstream.

In order to make such a blade 210, a main fiber preform analogous to that of the first embodiment is woven initially. Thereafter, box sections 243 analogous to those of the second embodiment are fitted against the bottom surfaces of the transverse segments of the main preform, against its distal edges. The attachment tabs of the main fiber preform are then folded around the box sections 243, which therefore act as inserts. The preform as finished off in this way and as shaped is then subjected to a step of matrix injection and consolidation analogous to that of the first embodiment.

Figure 9:
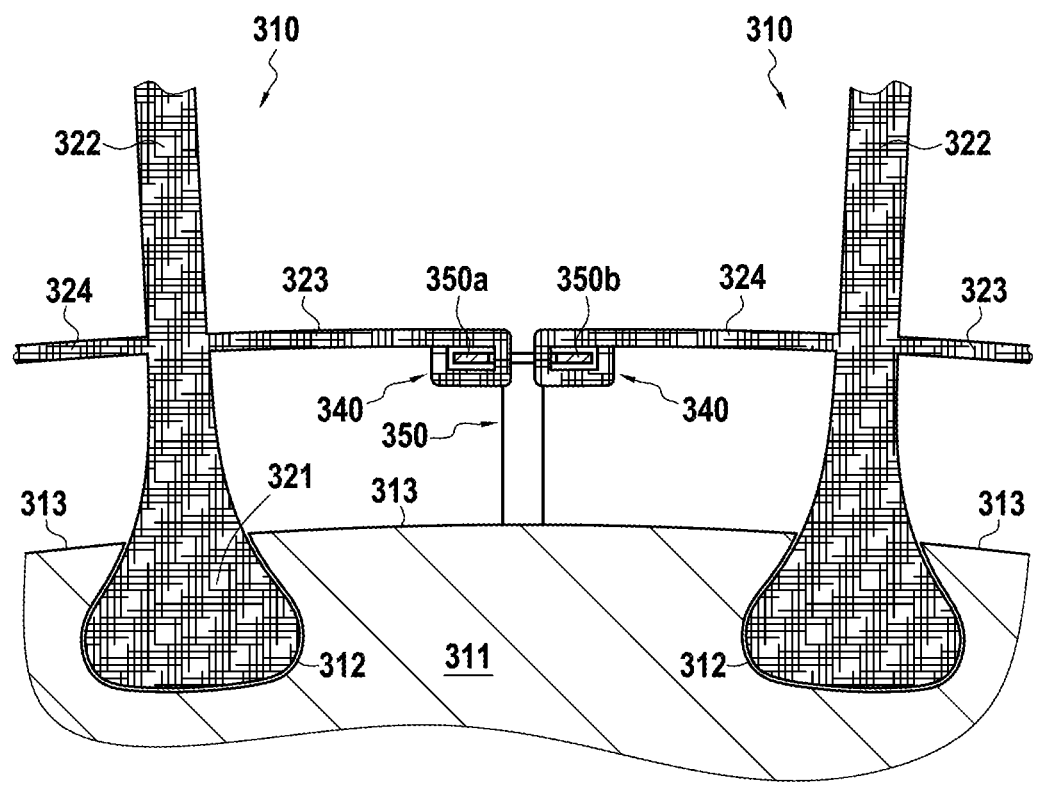
FIG. 9 is a fragmentary radial section view of a rotor wheel in a fourth embodiment.
Figure 10:
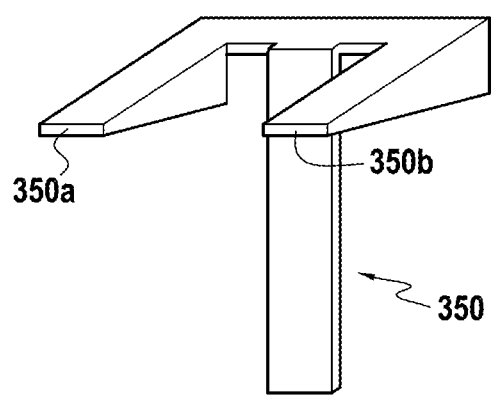
FIG. 10 is a perspective view of a hook in the fourth embodiment.

FIG. 9 shows a fourth embodiment in which the blades 310 are analogous to those of the first embodiment, but in which the disk 311 is provided with different hooks 350. As can be seen in FIG. 10, each hook 350 in this embodiment is provided with two distinct attachment fingers 350a, 350b extending side-by-side and configured to cooperate with two coinciding attachment portions 340 of two neighbouring platforms 323, 324.

It will naturally be understood that such a double hook can be used with a blade in accordance with any of the embodiments described.

The embodiments or implementations described in the present description are given by way of nonlimiting illustration, and a person skilled in the art can easily, in the light of this description, modify these embodiments or implementations, or can envisage others, while remaining within the ambit of the invention.

Furthermore, the various characteristics of these embodiments can be used singly or in combination with one another. When they are combined, these characteristics may be combined as described above or in other ways, the invention not being limited to the specific combinations described in the present description. In particular, unless specified to the contrary, a characteristic described with reference to any one embodiment may be applied in analogous manner to any other embodiment.

The invention claimed is:

1. A blade for a turbine engine, the blade comprising:
a blade root;
an airfoil portion extending upwards from the blade root;
a platform made of composite material and extending transversely to the airfoil portion at a junction between the blade root and the airfoil portion, wherein the platform extends from the blade root along a first axis; and
an attachment portion provided on a lower surface of the platform at a distal end of the platform, configured to cooperate with a first hook of the turbine engine, wherein the attachment portion is at a furthest position of the platform on the first axis away from the blade root.

2. The blade according to claim 1, made as a single piece of composite material by means of a preform, said preform being shaped in a mold and embedded in a matrix.

3. The blade according to claim 1, wherein the attachment portion is fitted to the platform.

4. A rotor wheel for a turbine engine, the wheel comprising a plurality of blades according to claim 1, and a disk or a downstream drum.

5. The wheel according to claim 4, wherein radial clearance of at least 0.5 mm, and/or tangential clearance of at least 1 mm is provided between the attachment portion of the platform of at least one of the plurality of blades and a corresponding first hook while the wheel is stationary.

6. A turbine engine including the wheel according to claim 4.

7. A turbine engine including at least one blade according to claim 1.

8. The blade according to claim 1, wherein a first portion of the platform is at a proximal location relative to the airfoil portion and a second portion of the platform is at a distal location relative to the airfoil portion.

9. The blade according to claim 8, wherein the second portion of the platform includes the attachment portion.

10. The blade according to claim 9, wherein the attachment portion forms an axial cavity on the lower surface of the platform.

11. The blade according to claim 1, wherein the attachment portion forms an axial cavity on the lower surface of the platform.

12. The blade according to claim 1, wherein:
the airfoil extends from the blade root in a first direction;
the platform extends from the blade root in a second direction that is perpendicular to the first direction; and
the attachment portion forms an axial cavity that extends in a third direction that is perpendicular to both the first direction and the second direction.

13. A disk for a rotor wheel, the disk having its circumference presenting a succession of slots and of teeth, each slot being configured to receive one of a plurality of blades, wherein at least one of the plurality of blades includes:
a blade root;
an airfoil portion extending upwards from the blade root;
a platform made of composite material and extending transversely to the airfoil portion at a junction between the blade root and the airfoil portion; and
an attachment portion provided on a lower surface of the platform at a distal end of the platform, configured to cooperate with a first hook of the turbine engine;

wherein at least one tooth among said teeth is provided with the first hook extending radially from a top surface of the tooth and configured to cooperate with the attachment portion of the at least one of the plurality of blades.

14. The disk according to claim 13, wherein at least one tooth among said teeth is provided with a second hook possessing at least two distinct attachment fingers, wherein the attachment fingers taper away from a body of the second hook.

15. A rotor wheel for a turbine engine, the wheel comprising a plurality of blades, and the disk according to claim 13.

16. The disk according to claim 13, wherein the attachment portion is provided in a middle zone of the platform of the one of the plurality of blades.

17. The disk according to claim 16, wherein the middle zone is formed by a portion of the platform of the one of the plurality of blades and a further portion of a platform of an adjacent blade of the plurality of blades.

18. The disk according to claim 13, wherein the hook is machined in a thickness of the disk; or
wherein the hook is fitted on a top surface of the disk.

19. A downstream drum for a rotor wheel configured to rotate synchronously with a disk carrying a plurality of blades, wherein at least one of the plurality of blades includes:
 a blade root;
 an airfoil portion extending upwards from the blade root;
 a platform made of composite material and extending transversely to the airfoil portion at a junction between the blade root and the airfoil portion; and
 an attachment portion provided on a lower surface of the platform at a distal end of the platform, configured to cooperate with a first hook of the turbine engine;
 the downstream drum including at least one third hook extending from an upstream face of the downstream drum and configured to cooperate with the attachment portion of the at least one of the plurality of blades.

20. A rotor wheel for a turbine engine, the wheel comprising a plurality of blades, and the downstream drum according to claim 19.

\* \* \* \* \*